United States Patent [19]

Arnold et al.

[11] Patent Number: 5,518,206
[45] Date of Patent: May 21, 1996

[54] CLOSURE DEFAULT INDICATOR

[75] Inventors: Michael J. Arnold, Bangor; Kenneth H. Johnson, Belfast; Brian J. Hall, Comber, all of Northern Ireland

[73] Assignee: Short Brothers Plc, Belfast, Northern Ireland

[21] Appl. No.: 182,195

[22] PCT Filed: May 20, 1993

[86] PCT No.: PCT/GB93/01032

§ 371 Date: Mar. 21, 1994

§ 102(e) Date: Mar. 21, 1994

[87] PCT Pub. No.: WO93/24368

PCT Pub. Date: Dec. 9, 1993

[30] Foreign Application Priority Data

May 22, 1992 [GB] United Kingdom .................. 9210997
Jun. 15, 1992 [GB] United Kingdom .................. 9212666

[51] Int. Cl.$^6$ ...................................................... B64C 1/14
[52] U.S. Cl. ................................ 244/129.4; 292/256.69; 292/DIG. 49; 292/DIG. 65
[58] Field of Search .................................. 244/54, 129.1, 244/129.4, 129.5, 53 R; 292/247, 113, 256.69, DIG. 49, DIG. 65

[56] References Cited

U.S. PATENT DOCUMENTS

| | | |
|---|---|---|
| 4,127,215 | 11/1978 | Morrison . |
| 4,150,802 | 4/1979 | Evelyn et al. ............................ 244/54 |
| 4,265,474 | 5/1981 | Poe . |
| 4,498,823 | 2/1985 | Trautman . |
| 4,613,099 | 9/1986 | Smith et al. ........................... 244/53 R |
| 4,679,750 | 7/1987 | Burnans ............................... 244/129.4 |
| 4,905,892 | 3/1990 | Fischer . |
| 5,011,200 | 4/1991 | Glancy et al. . |

FOREIGN PATENT DOCUMENTS

| | | | |
|---|---|---|---|
| 330814 | 9/1989 | European Pat. Off. | ............ 244/129.5 |
| 480827 | 4/1992 | European Pat. Off. | ............ 244/129.4 |
| 9017146 | 4/1991 | Germany . | |
| 2251452 | 7/1992 | United Kingdom . | |

Primary Examiner—Galen L. Barefoot
Attorney, Agent, or Firm—Lyon & Lyon

[57] ABSTRACT

A structural assembly comprises first and second closure parts displaceable between a closed disposition in which they are locked by a locking mechanism and in which they close off the front side of the closure parts from the rear side and an open disposition in which they are spaced apart for access to the rear side of the closure parts and a default indicating device comprising a projection element (34) which is movable to the rear side of the closure parts where it is stowed and which releases when the closure parts move to an open disposition and moves to a projecting position in which it projects from the rear side to the front side of the closure parts to provide a visual warning that the closure parts are not in the closed disposition. The closure parts in one embodiment are fan cowl doors of an aero engine nacelle which are hinged at their upper edges to the upper part of the nacelle and which have bottom edges which move into the closed disposition at the base of the nacelle. The projecting element (34) in the projecting position then depends from the base of the nacelle.

30 Claims, 8 Drawing Sheets

CLOSURE DEFAULT INDICATOR

The present invention relates to structural assemblies having closure parts one or each of which is displaceable relatively to the other between closed and open dispositions and which are locked in the closed disposition by a locking mechanism and is particularly although not exclusively concerned with a fan cowl door assemblies for aero engine nacelles.

Aero engine nacelles are commonly provided with right hand and left hand fan cowl doors which have upper edges which are hinged along the upper part of the nacelle and which have lower edges which are held in engagement with each other at the base of the nacelle by latch mechanisms arranged at spaced positions along the lower edges of the doors.

It has been found that where toggle lever operated latch mechanisms are used for locking together the bottom edges of fan cowl doors the latching operation can be overlooked or ineffectively carried out. For example, the toggle lever fitted on the lower edge of one of the fan cowl doors can be operated through its full throw without engagement with the cooperating part of the latch mechanism on the lower edge of the other door or indeed not operated at all. The default is however not readily observed by ground personnel as the weight distribution of the fan cowl doors which are hinged at their upper edges brings the bottom edges of the doors into engagement with each other and the latch mechanisms are so constructed that the toggle lever lies flush with the surface of the mechanism whether or not the latching operation has been carried out or carried out effectively.

Closure defaults as above described have led to fan cowl doors being lost in flight and although no injuries have been reported from lost cowl door incidents aircraft and property on the ground have been damaged.

A review by the Federal Aviation Authority (FAA) of a number of inflight incidents where engine cowl doors have been lost has revealed that the greatest cause of such incidents has been improper latching of the latching mechanisms at the lower edges of the doors or a complete failure to operate the latch mechanisms.

As a result of the review, the FAA require that for any nacelle cowling, the opening of which could preclude continued safe flight and landing there must be provision for direct visual inspection of the latching mechanism to verify that the cowl doors are fully closed and locked. Such provision must be discernable under operational lighting conditions by appropriate crew members, if necessary using a flash light or the equivalent lighting source.

It is an object of the present invention to provide means whereby a default in the closure of the fan cowl doors of an aero engine nacelle can readily be detected by ground personnel.

According to a first aspect of the present invention there is provided a structural assembly comprising first and second closure parts displaceable relative one another between a closed disposition in which a closing edge of one closure part is generally aligned with a closing edge of the other closure part to provide a rear side of the closure parts closed off from a front side of the closure parts and open dispositions in which the closing edge of one closure part is spaced from the closing edge of the other closure part, a locking mechanism for locking the closure parts in the closed disposition and a default indicating device comprising a projection element which is movable against biasing means to the rear side of the closure parts, and is released when the closure parts move to a predetermined open disposition wherein a gap is formed between the closing edges of the closure parts and which moves in response to the biasing means to a projecting position in which it projects through the cap between the closure parts to the front side to provide on the front side of the closure parts a visual warning that the closure parts are not in the closed disposition. The default indicating device may be operable independently of the locking mechanism.

In a first embodiment of the invention hereinafter to be described the projection element is in the form of an elongate indicator arm, the first of the closure parts includes arm support means at the rear side thereof, and the indicator arm is mounted for rotation at a pivotal end thereof on the support means and is rotatable from an operational position at the rear side of the closure parts to the projecting position under the action of the biasing means.

In the first embodiment of the invention hereinafter to be described the pivotal end of the arm is additionally movable on the support means in the direction of the axis of rotation of the arm from a stowed axial position in which the arm is held captive at the rear side of the first closure part to an operational axial position in which the arm is clear of the first closure part so as to be free therefrom to rotate to the projecting position. The arm is biased to the operational axial position and restraining means are provided to prevent movement of the arm from the stowed axial position to the operational axial position. Release means are provided to cause the restraining means to release the arm when the closure parts are moved toward their closed disposition and into a release disposition, thereby to allow the arm to move to the operational axial position whereby subsequent movement of the two closure parts away from their release disposition to the predetermined omen disposition results in movement of the arm from the operational axial position to the projecting position.

The restraining means may take the form of an arm restraining means on the first closure plate which is engaged by the arm and the release means is provided on the second closure plate for releasing the arm from the restraining means when the two parts are moved into the release disposition.

In the first embodiment of the invention hereinafter to be described the arm is formed with an aperture spaced from the pivotal end of the arm and the release means comprises a pin mounted on the second closure part for engagement in the aperture when the closure parts are moved into the release disposition. The pin is located in a position in which its axis is offset from the axis of the aperture when the arm is in the stowed axial position and the pin is so contoured as to engage in the aperture in the arm when the arm is in the stowed axial position and to displace the arm from the restraining means on the first closure part when the closure parts are moved into the release disposition, thereby to allow the arm to move to the operational axial position and the aperture being so shaped and dimensioned in relation to the pin that the arm is held by the pin in the operational axial position preferably the aperture is formed in a free end of the arm remote from the pivotal end and the arm restraining means on the first closure part is engaged by the free end of the arm.

The arm restraining means in the first embodiment hereinafter to be described is such as to restrain the arm in the stowed axial position while the closure parts are being moved into their closed disposition but is insufficient to restrain the arm in initial normal use of the assembly in the event that the closure parts are not brought to in the closed disposition.

In the first embodiment of the invention hereinafter to be described the pin includes a base portion for holding the arm in the operational axial position and an end portion having a locally reduced lateral dimension and the aperture in the arm communicates with a slot in the arm, whereby when an attempt to bring the closure parts to the closed disposition fails with the end part only of the pin being brought to a position corresponding to the operational axial position of the arm, the arm during initial normal use of the assembly releases from the restraining means, moves to the operational axial position and then under the torsional force of the spring and by engagement of the locally reduced end part in the slot in the arm moves to an intermediate projecting position in which it projects through the gap between the closure parts to the front side of the closure parts, thereby to give a visual warning that the closure parts are not in the closed disposition.

In the first embodiment of the invention hereinafter to be described the biasing means comprises a torsion element one end of which is secured to the first closure part and the other end of which is secured to the arm, whereby torsion is imparted to the element when the arm is moved from its projecting position to the rear side of closure parts and the torsional force released to move the arm from its operational axial position to its projecting or intermediate projecting position.

Preferably, the torsion element is also a compression element and the arm in moving into the stowed axial position compresses the element, the compressive force of which then serves upon release of the arm from the restraining means to drive the arm to its operational axial position.

According to a second aspect of the present invention there is provided a structural assembly comprising first and second closure parts displaceable relative to one another between a closed disposition in which a closing edge of one closure part is generally aligned with a closing edge of the other closure part to provide a rear side of the closure parts closed off from a front side of the closure parts and an open disposition in which the closing edge of each closure part is spaced from the closing edge of the other closure part, a locking mechanism for locking the closure parts in the closed disposition and a default indicating device comprising a projection element which is movable to the rear side of the closure parts and it is held in a retracted position when the closure parts are in the closed disposition, said projection element being held against a biasing force which is urging said projection element to a projecting position, and which is released when the closure parts move as a result of the biasing force to the predetermined open disposition and upon release from the retracted position moves to a projecting position in which it projects at the front side of the closure parts through translational movement from the retracted position at the rear side of the closure parts to the projecting position to provide on the front side a visual warning that the closure parts are not in the closed disposition.

In a second embodiment of the invention hereinafter to be described the first of the closure parts includes support means at the rear side thereof and the projection element is mounted on the support means for translational movement from the retracted position at the rear side of the closure parts to the projecting position.

In the second embodiment of the invention hereinafter to be described the projection element is of elongate form and moves from the retracted position to the projecting position in a direction parallel to the longitudinal axis of the element. Where the orientation of the assembly is such that the translational movement of the projection element from the retracted position to the projecting position is downward, the biasing force is provided by the weight of the projection element.

In the second embodiment of the invention hereinafter to be described holding means are provided to hold the projection element in the retracted position when the closure parts are in the closed disposition and to release the projection element when the closure parts move to the predetermined open disposition. The holding means conveniently comprises a pin mounted on the second closure part for engagement with the projection element to hold the projection element in the retracted position when the closure parts are in the closed disposition.

In the second embodiment of the invention hereinafter to be described the projection element is formed with an abutment face and the pin has a forward end which in an engaging position of the pin engages with the abutment face on the element to hold the projection element in the retracted position when the closure parts are in the closed disposition. Movement of the closure parts to the predetermined open disposition causes the forward end of the pin to disengage from the abutment face on the element to allow the element to move from the retracted position to the projecting position.

In the second embodiment of the invention hereinafter to be described the support means on the first closure part so supports the projection element in the projecting position that the projection element is clear of the pin, whereby the closure parts can be brought to the closed disposition with the projection element in the projecting position. The pin is biased by a biasing force into the engaging position and is displaceable against the biasing force applied to it to permit the projection element to be moved from the projecting position into the retracted position whereupon the pin is biased by the biasing force into the engaging position in which the forward end engages with the abutment face on the projection element. The abutment face on the projection element is conveniently formed by an upper end wall of a slot formed in the element and the pin is biased into the engaging position by a biasing spring mounted on the second closure part.

In the second embodiment of the invention hereinafter to be described the forward end of the pin and the upper end of the projection element are so contoured as to facilitate displacement of the pin by the projection element when bringing the projection element from the projecting position to the retracted position with the closure parts in the closed disposition.

In the second embodiment of the invention hereinafter to be described the support means on the first closure part so positions the projection element that its outermost longitudinal side face is flush with the edge of the first closure part, and the first closure part includes a cut-away portion at the edge thereof to accommodate and provide for displacement of the projection element between the retracted position and the projection position. The outermost end of the projection element is also so dimensioned as to substantially fill the cut away portion when the projection element is in the retracted position and the retracted position is such that the outermost end of the projection element is flush with the front surface of the first closure part when the projection element is in the retracted position.

In the first and second embodiments of the invention hereinafter to be described the locking mechanism takes the form of a toggle operated latch mechanism comprising a first component part including a toggle lever and a toggle lever operated hook element which extends from one of the closure parts, and a terminal hook and a second component part including a fixed element which is mounted on the other closure part, wherein engagement of the hook behind the fixed element and complete throw of the toggle lever draws the closure parts into the closed disposition and locks them in the closed disposition.

According to a third aspect of the present invention there is provided an aero engine nacelle including a structural assembly according to the first or second aspect of the invention, wherein the first and second closure parts are access doors in an aero engine nacelle which has said closing edges which move into the closed disposition at a predetermined position of the access doors and are locked in the closed disposition by the locking mechanism whereby the projecting element, when in the projecting position, extends from the body of the nacelle and is visible to personnel to alert them to the fact that the access doors have not been moved into the closed disposition.

In the first and second embodiments of the invention hereinafter to be described the access doors are right hand and left hand fan cowl doors which are hinged at their upper edges to the upper part of the nacelle wherein said closing edges are bottom edges which move into the closed disposition at the base of the nacelle and the projecting element, when in the projecting position, depends from the body of the nacelle.

The locking mechanism in the first and second embodiments of the invention hereinafter to be described comprises a plurality of latch mechanisms arranged at spaced positions along the closing edges of the doors and the default indicating device is located between two adjacent latch mechanisms.

Two embodiments of the invention will now be described by way of example with reference to the accompanying drawings in which.

Figure 1:
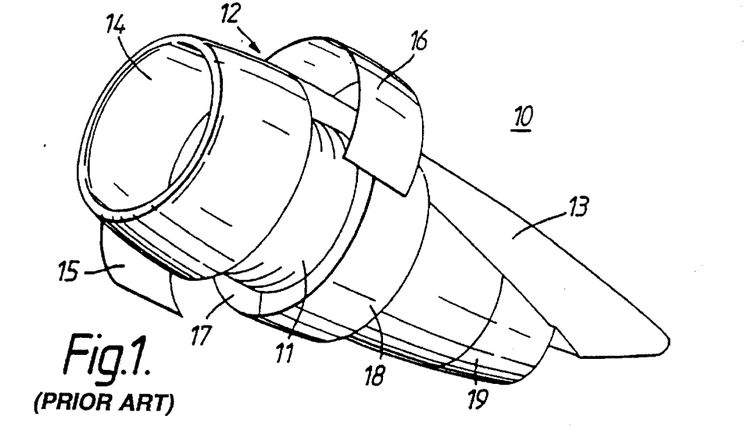
FIG. 1 is a schematic perspective view of a fan jet aero engine under-wing mounted with its right hand and left hand fan cowl doors in an open disposition

Referring first to FIG. 1, a fan jet aero-engine 10 comprises a core engine 11 enclosed within a nacelle structure 12 which includes a fairing 13 by which the engine 10 is under-wing mounted, a nose cowl 14, right hand and left hand fan cowl doors 15 and 16 shown in a hinged back open disposition, thrust reverser "C" duct sections 17 and 18 and a nozzle assembly 19.

Figure 2:
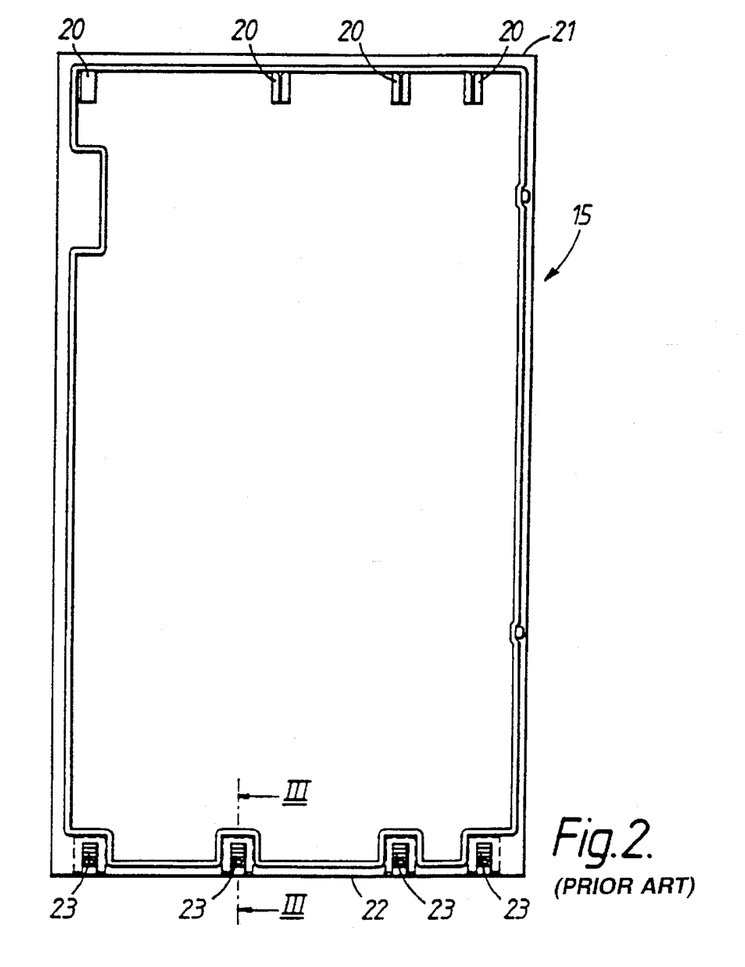
FIG. 2 is a schematic plan view of the rear side of the right hand fan cowl door shown in FIG. 1

The fan cowl door 15 is shown in FIG. 2 which is a view of the rear side of the door. The door 15 comprises four hinges 20 which are spaced apart along the upper edge 2 of the door 15 and by which the door 15 is hinged to an upper support frame (not shown) on the nacelle structure 12. The door 15 is provided along its lower edge 22 with parts 23 of four latch mechanisms, each part 23 having a cooperating part on the lower edge of the fan cowl door 16, which is hinged to the upper support frame in the same manner as the door 15.

Figure 4:
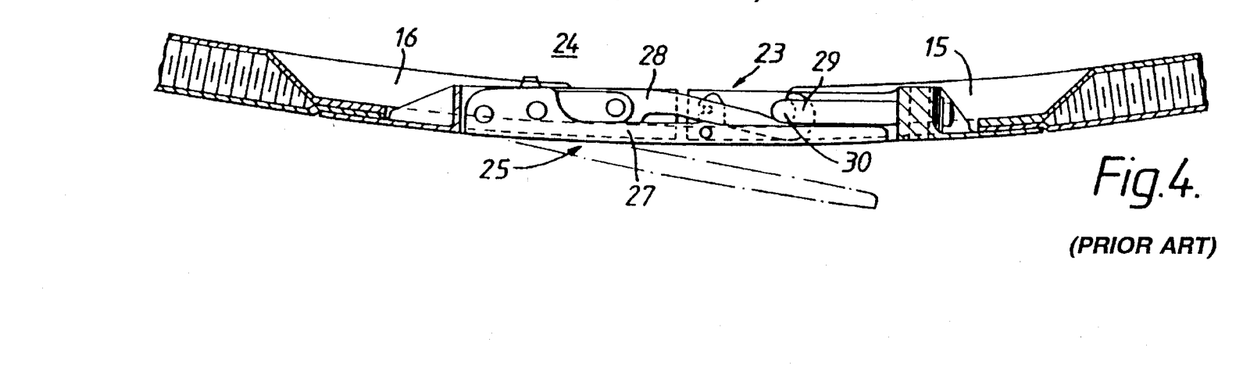
FIG. 4 is a scrap section taken on the line IV—IV in FIG. 3

Referring now to FIGS. 2 and 4, a latch mechanism 24 is shown which includes the component part 22 mounted on the door 15 and a cooperating part 25 mounted on the door 16 at its lower edge 26.

As best seen in FIG. 4, the latch mechanism 24 is a toggle lever operated latch mechanism. The part 25 includes a toggle lever 27 and a toggle lever operated hook element 28 which extends from the door 16 across the lower edge 26 and which is provided with a terminal hook 29 which engages as shown with a bar element 30 on the cooperating part 23 on the door 15.

Figure 3:
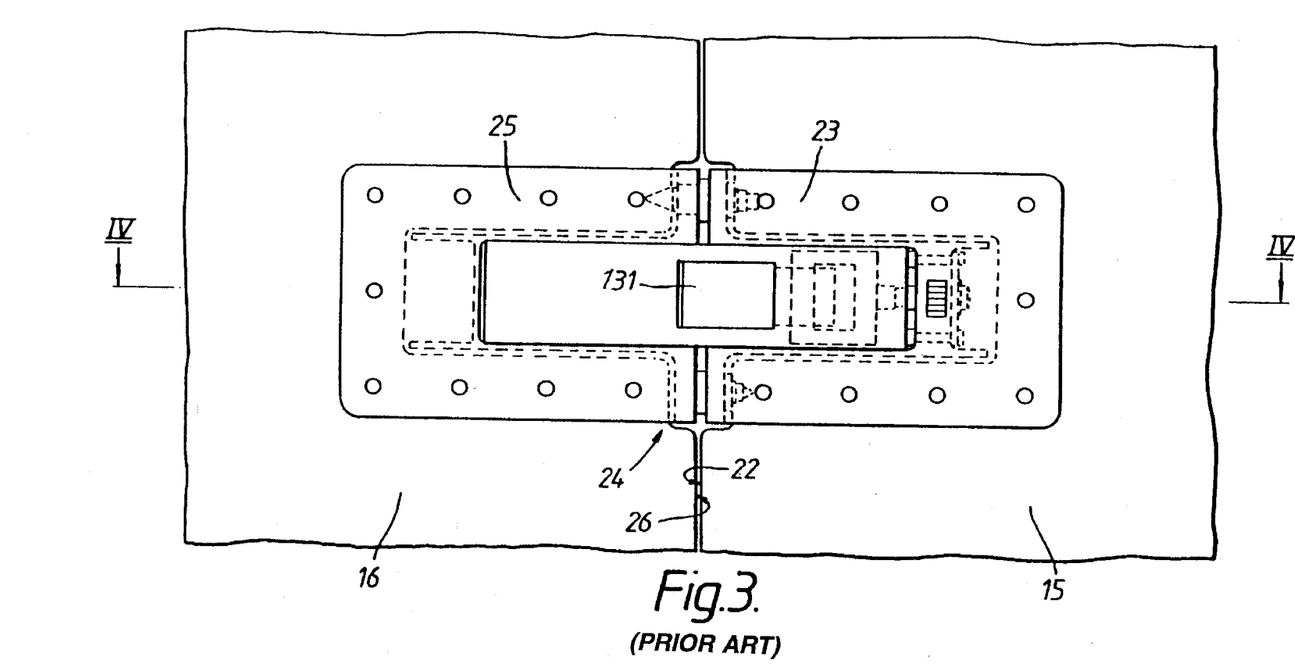
FIG. 3 is a scrap plan view from below of the fan cowl doors in their closed disposition showing a latch mechanism for locking the lower edges of the two fan cowl doors

In operation, the toggle lever 27 on the latch part 25 is removed from its recessed position (shown in full line) flush with the surface of the part 25 to the chain line position shown in FIG. 4 to allow the hook element 28 to engage behind the bar element 30. The toggle lever 27 is then returned to its recessed position shown in full line in FIG. 4 in which it locks the lower edges 22 and 26 of the doors 15 and 16 in their closed disposition as shown in FIGS. 3 and 4. A release lever 131 is provided to enable the toggle lever 27 to be moved out of its recessed position when the latching parts 23 and 25 are to be disengaged and the doors 15 and 16 hinged outwardly for inspection of the core engine 11.

With the doors 15 and 16 in an open disposition, the toggle lever 27 can of course be brought to the recessed position in the door 16 at which position the hook element 28 is simply held forwardly of the lower edge 26 of the door 16. When the two doors 15 and 16 are then lowered toward their closed disposition the foremost face of the hook 29 moves into abutting relation with the bar element 30 of the latch part 23. The two doors 15 and 16 will then have the appearance of being in their closed position but the latch mechanism 24 will not have been operated. In such circumstances, if the default is overlooked by ground personnel, the fan cowl doors 15 and 16 will subsequently part during flight of the aircraft and be torn away from the nacelle structure.

To provide a visual indication that a closure default has occurred there is now described with reference to FIGS. 5 to 9, a default indicating device according to a first embodiment of the invention.

Figures 5, 6, 7, 8:
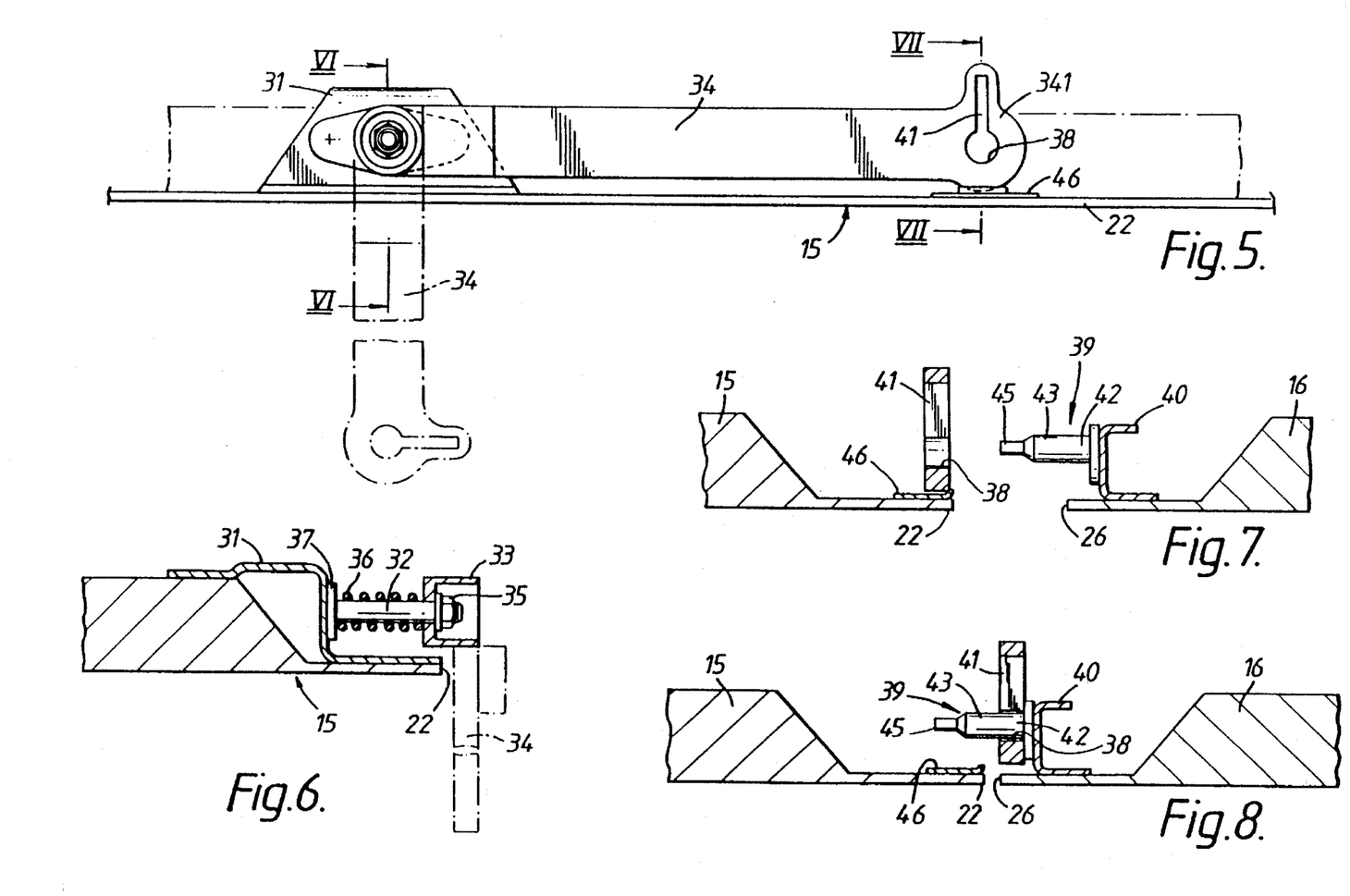
FIG. 5 is a schematic end view of the bottom edge of the right hand fan cowl door illustrated in FIG. 1 showing part of a default indicating device according to a first embodiment of the invention
FIG. 6 is a schematic scrap section taken on the line VI—VI in FIG. 5
FIG. 7 is a schematic scrap section taken on the line VII—VII in FIG. 5 and including both fan cowl doors as illustrated in FIG. 1 and in an open disposition
FIG. 8 is a schematic section taken on the line VII—VII in FIG. 5 and including both fan cowl doors as illustrated in FIG. 1 and in a closed disposition.

Referring now to FIGS. 5 and 6, the fault indicating device has cooperating parts mounted at the lower edges 22 and 26 of the doors 15 and 16 at a location between two adjacent latch mechanisms 24. The lower edge 22 of the fan cowl door 15 is modified by the addition of a bracket 31 upon which is mounted a pin 32 which supports a boss 33 of an indicator arm 34. The boss 33 is held captive on the pin 32 by a nut 35 and is mounted on the pin for rotation thereon and for axial displacement therealong. The pin 32 carries a spring 36, one end of which is secured to a plate 37 carried by the bracket 31 and the other end of which is secured to the boss 33 of the arm 34. The spring 36 serves in a manner hereinafter to be described to control the rotational displacement of the arm 34 as well as its axial displacement on the pin 32.

Referring now to FIGS. 5 and 7, it will be seen that the free end 341 of the arm 34, in the position shown in full line in FIGS. 5 and 7, engages with the lip of a bracket 46 secured to the rear face of the door 15 at the edge 22. It will furthermore be seen that the end 341 of the arm 34 is formed with an aperture 38 and a communicating slot 41 and that the door 16 carries a pin 39 mounted on a bracket 40 secured to the door 26 in the region of the edge 26. The pin 39 has a base portion 42 of circular cross section, a tapered portion 42 and an end portion 45 of reduced circular cross-section. The pin 29 is so arranged on the bracket 40 that the principal axis of the base portion 42 is offset from the axis of the aperture 38 in the disposition shown in FIG. 7.

In the operation of the device illustrated in FIGS. 5 to 8, it will first be assumed that the fan cowl doors 15 and 16 are in an open disposition, that is to say, they are hinged outwardly with the lower edges 22 and 26 spaced apart and that the arm 34 is in the projecting position shown in chain dot line in FIGS. 5 and 6. In this projecting position, the arm 34 is extending outwardly from the front face of the door 15 and obstructs the bringing of the doors 15 and 16 into the closed disposition. It furthermore provides a visual indication that the doors 15 and 16 are not in their closed disposition and not locked by the latching mechanism 24 described with reference to FIGS. 3 and 4.

When it is desired to bring the doors to their closed disposition, the arm 34 is pivoted on the pin 32 against the torsional force in the spring 36 and raised to an intermediate position in which the arm 34 is horizontal with the pivotal end in a position in which the boss 33 as shown in FIG. 6 is bearing against the nut 35 by the action of the spring 36. The arm 34 is then moved axially inwardly on the pin 22 against the compressive force of the spring 36 to bring the free end 341 of the arm 34 behind the lip on the bracket 46 as illustrated in FIGS. 5 and 7.

The rotational displacement of the arm 34 as above described imparts torsion to the spring 36, while axial displacement of the boss 23 of the arm 34 on the pin 32 brings the spring 36 under compression.

With the arm 34 in the stowed position as shown in FIGS. 5 and 7, the doors 15 and 16 can then be brought to their closed disposition by releasing the toggle lever 27 of each of the locking mechanisms 24 from its recessed position, engaging the hook 29 of the hook element 28 behind the bar element 30 and drawing the edges 22 and 26 of the two doors 15 and 16 together by returning each toggle lever 27 to its recessed position.

In bringing the door edges 22 and 26 to their closed disposition under the action of the latch mechanisms 24, the pin 39 engages the aperture 38 in the free end of the arm 34, the tapered portion 43 of the pin 39 bearing against the upper edge of the aperture 38 and lifting the free end 341 of the arm 34 out of engagement with the lip on the bracket 46.

With the end 341 of the arm 34 clear of the bracket 46, the boss 33 on the other end of the arm 34 moves axially along the pin 32 under the axial force of the spring 36 so that the boss 33 is brought to bear against the nut 35 on the pin 32 and the free end 341 of the arm 34 moves to the position shown in FIG. 8 in which it engages fully over the base portion 42 of the pin 39. In this position, which may be termed its operational axial position, the arm 34 is held captive by the pin 39.

When the doors 15 and 16 are again opened for inspection or maintenance, the pin 39 on the door 16 completely withdraws from the aperture 38 in the arm 34 which is then driven to its projecting position as shown in chain dot line in FIGS. 5 and 6 under the torsional force stored in the spring 36.

As the doors 15 and 16 are moved to their closing disposition, the end part 45 of the pin 39 engages in the aperture 38 of the arm 34. In the event that the latch mechanism 24 is not operated so that the hook 29 of the hook element 28 simply abuts the bar element 30 the failure to operate the latch mechanism 24 needs to be indicated. To this end, the end part 45 of the pin 39 is of reduced circular cross-section so that it is able to engage in the slot 41 in the end of the arm 34. Closure of the doors 15 and 16 normally requires considerable effort and the lip on the bracket 46 and the design of the arm 34 is made such that any vibration or force normally applied in attempting to close the doors 15 and 16 would cause the end 341 of the arm 34 to jump from the bracket 46. The arm 34 then moves axially into its operational position as previously described and is driven downwardly by the torsion stored in the spring 36, bringing the end part 45 of the pin 39 into the slot 41 in the end of the arm 34. Such movement of the arm 34 although limited causes it to move into the gap between the edges 22 and 26 of the doors 15 and 16 to provide a visual warning that the latch mechanism 24 has not been operated.

In circumstances where the doors 15 and 16 are spaced further apart during a default in bringing them to the closed disposition and locking them by the latching mechanism 24, the arm 34 will be dislodged from its stowed position and jump from the bracket 46 and move as hereinbefore described to its fully projecting position.

Figure 9:
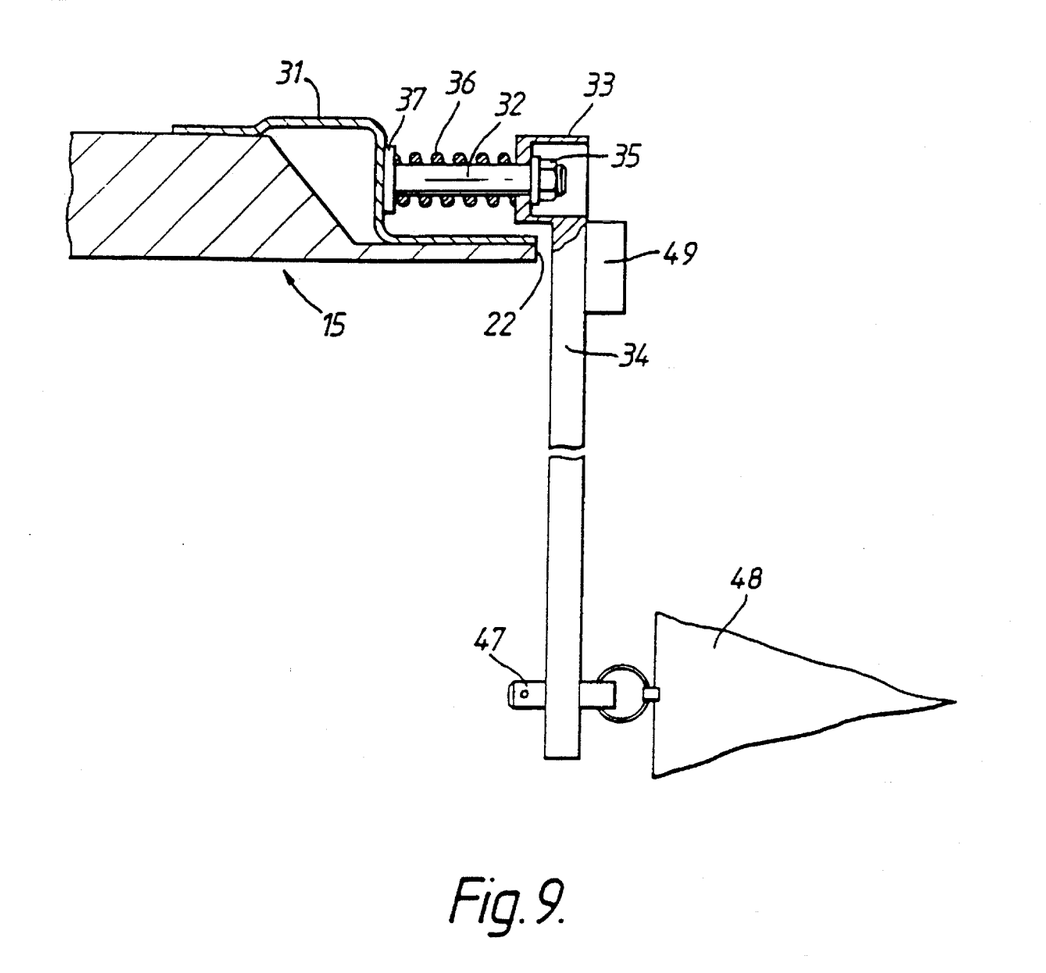
FIG. 9 is a schematic scrap section corresponding to that of FIG. 6 and showing a modification to the default indicating device according to the invention.

The secure closing and locking of the doors 15 and 16 should be strictly monitored and to this end means are preferably provided for preventing the arm 34 from being moved to the stowed position without a record being made of carrying out this step. Preferably, a requirement should be written into the relevant maintenance manual and the flight engineer should be required to provide comfirmation that the procedures for closing and locking the doors 15 and 16 have been followed. Such monitoring can conveniently be achieved as illustrated in FIG. 9 by the inclusion of a pip pin 47 which is arranged to foul the edge 22 of the door 15 when an attempt is made to move the arm to the stowed position. The pin 47 carries a warning pennant 48 providing a further visual warning and to ensure that the closure procedures have been followed the engineer has first to withdraw the pin 47 from the arm 34 and record that it has been removed as a further confirmation that the door closing procedures have been followed.

It will be appreciated that both the arm 34 and the pennant 48 should be readily visible in poor lighting conditions and may advantageously have a fluorescent red colour.

As a further safeguard a resilient pad 49 may be provided on the arm 34 which would maintain an increased gap between the edges 22 and 26 of the doors 15 and 16 while the arm 34 is in the fully projecting position so that no serious attempt would be made to operate the latching mechanisms 24 with the doors 15 and 16 so obviously not in their closed disposition.

Referring now to FIGS. 10 to 14, a default indicating device 132 according to the second embodiment of the invention is shown. It comprises a projection element 133 which is vertically slidable between a support bracket 134 which is secured to a latch body 135 of the left hand latch component part 25 on the fan cowl door and a guide bracket 136 secured to a latch body 137 of the right hand latch component part 22 on the fan cowl door 15.

Figure 11:
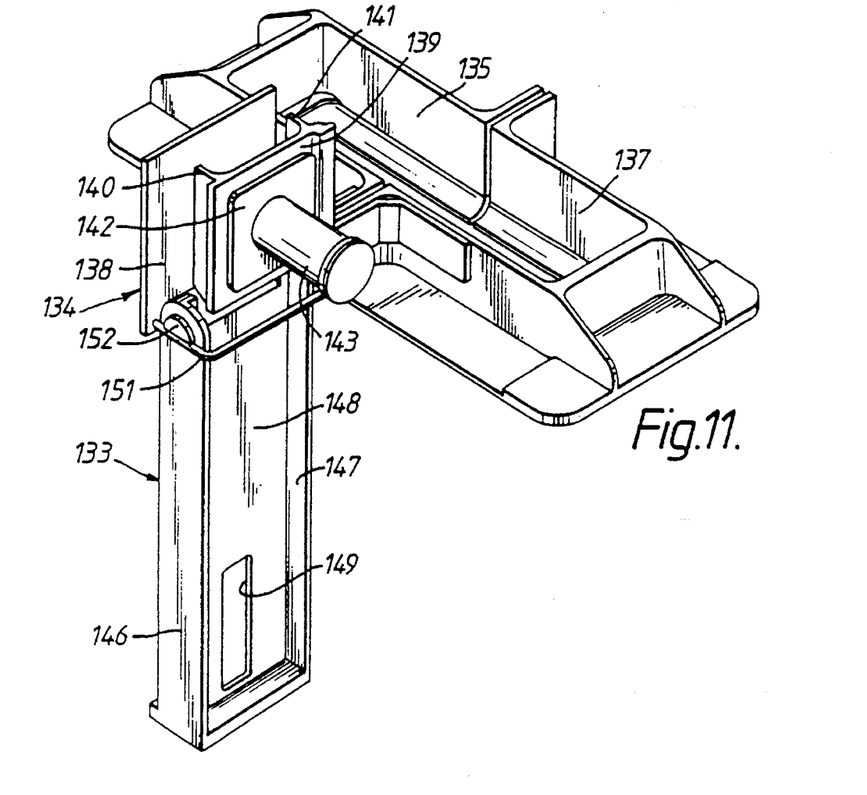
FIG. 11 is a schematic isometric view corresponding to that shown in FIG. 10, except insofar as the projection element of the default indicating device is shown in a projecting position.
Figure 12:
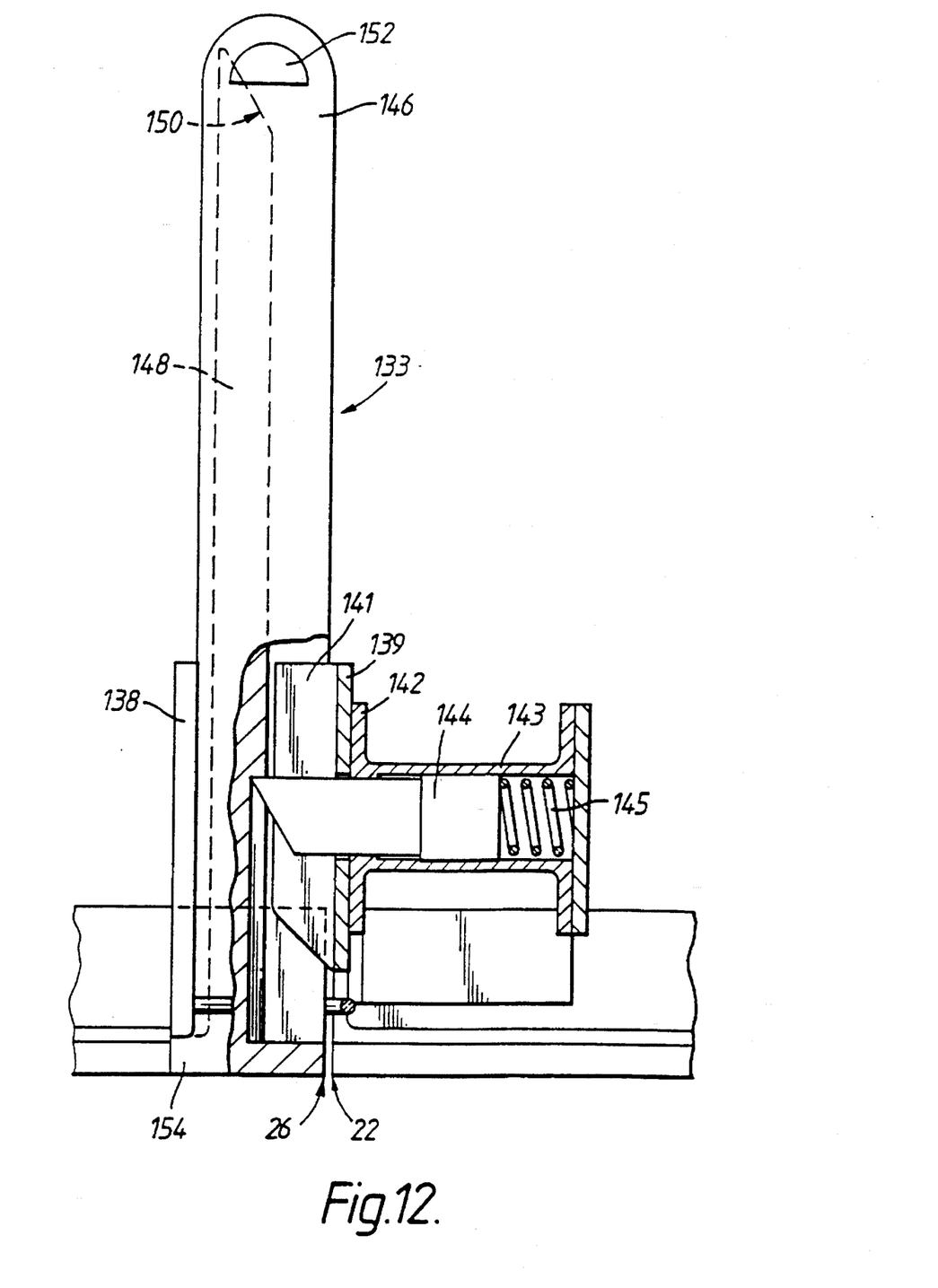
FIG. 12 is a part sectional schematic side elevation of the default indicating device shown in FIG. 11, with the projection element in the stowed position.

As best seen in FIG. 11 the support bracket 134 comprises a flat metal plate 138, while the guide bracket 136 comprises a flat plate 139 which has on one face thereof guide rail elements 140 and 141 and which carries on the other face thereof a support plate 142 which supports a cylindrical housing 143 carrying, as shown in FIG. 12, a snib element 144 which passes through openings in the plates 139 and 142 and which is biased by a compression spring 145 in the direction of the plate 138.

Figure 10:
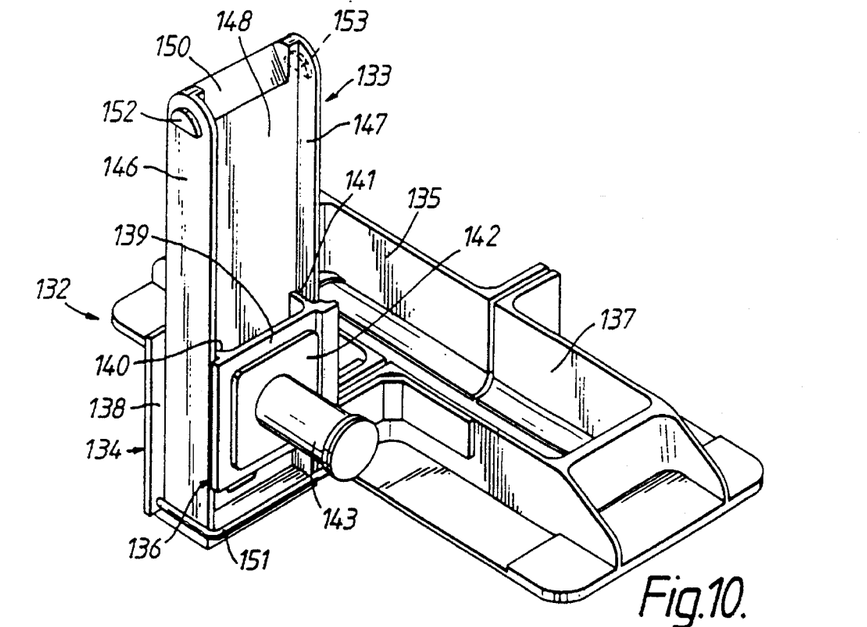
FIG. 10 is a schematic isometric view of a default indicating device according to a second embodiment of the invention and showing a projection element of the device in a showed position.
Figure 13:
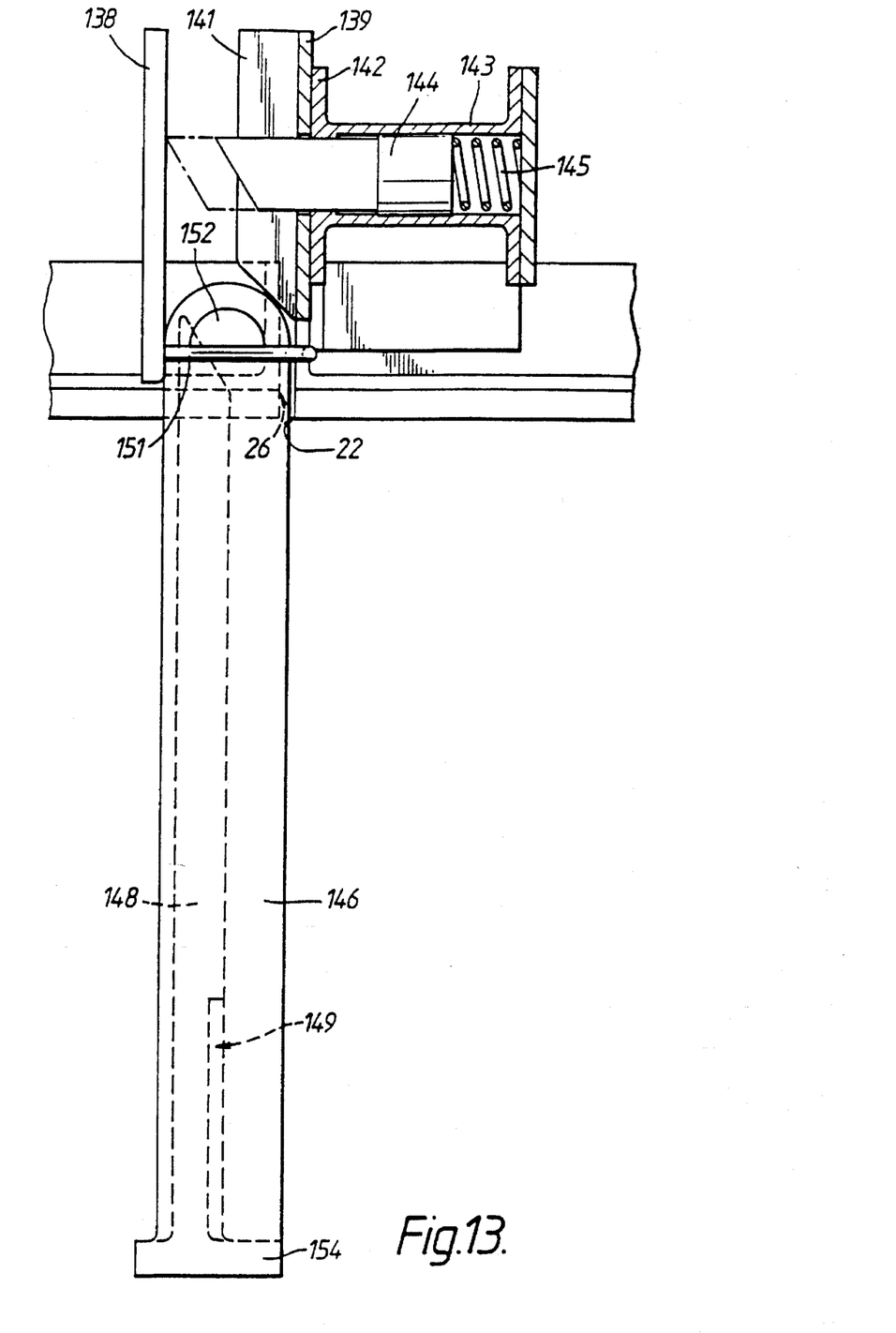
FIG. 13 is a schematic side elevation of the default indicating device shown in FIG. 11, with the projection element in the projecting position.

The projection element 133, as best seen in FIGS. 11 and 13, which show the element in its projecting position, is generally of H-section along most of its length and comprises longitudinally extending side flanges 146 and 147 and a bridging portion 148 which includes a recess 149 and which terminates at its upper end, as best seen in FIGS. 10 and 13, in a ramp end portion 150.

As will be seen from FIGS. 10 and 11, the flanges 146 and 147 of the projection element 133 are arranged to bear against the plate 138 and to ride on the outside of the rail elements 140 and 141 which serve to guide the element 133 during vertical movement to and from the retracted position shown in FIG. 10.

The support bracket 134 furthermore includes a loop element 151 while the flanges 146 and 147 of the projection element 133 are provided with lugs 152 and 153 which cooperate with the loop element 151 when the element 133 moves to its projecting position as shown in FIG. 11 where the element 133 is arrested by engagement of the lugs 152 and 153 with the loop element 151.

Figure 14:
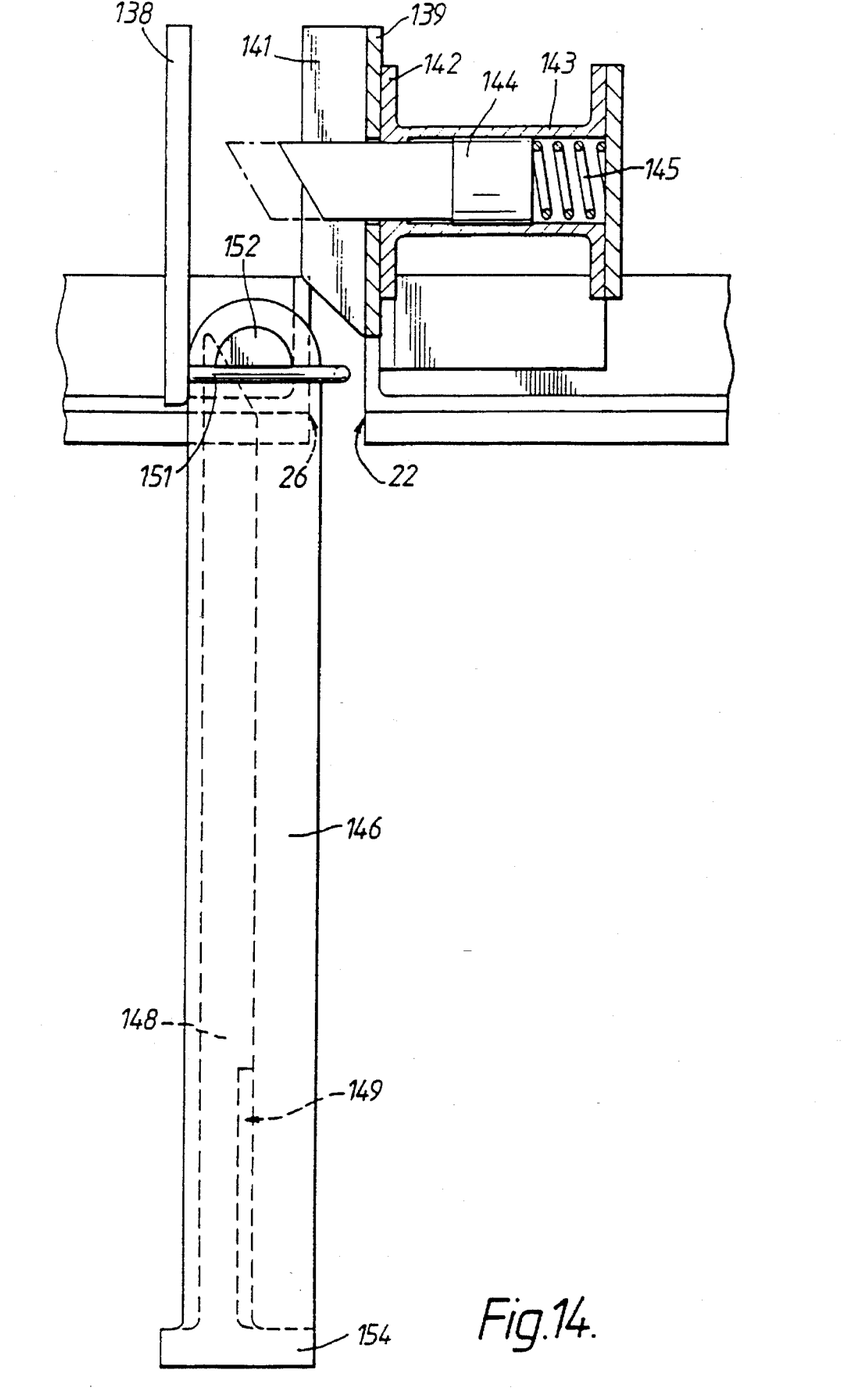
FIG. 14 is a schematic side elevation, corresponding to that shown in FIG. 13, with the fan cowl doors so spaced apart that the projection element can no longer be held in its retracted position.

In the operation of the device illustrated in FIGS. 10 to 14, it will first be assumed that the fan cowl doors 15 and 16 are in an open disposition, that is to say, they are hinged outwardly with the lower edges 22 and 26 spaced apart and that the projection element 133 is in the projecting position shown in FIGS. 11, 13 and 14.

During a normal operation of closing and locking the fan cowl doors 15 and 16, the two doors are moved towards their closed disposition and the four latch mechanisms 24 operated with the hook 29 engaging behind the bar element 30 of the latch part 23. In this position, the door edges 22 and 26 are brought in close proximity to each other and take up the disposition shown in FIG. 13. With the doors 15 and 16 properly locked in this closed disposition, the projection element 133 is then pushed vertically upwardly to its retracted position, during which movement the forward end of the snib element 144 rides over the ramp portion 150 at the top of the projection element 133 and then engages in the slot 149 under the biasing action of the spring 145 to hold the projection element 133 in its retracted position as shown in FIG. 10, by engagement of the forward end of the snib element 144 with the upper end wall of the slot 149.

When the doors 15 and 16 are again opened for inspection or maintenance, the latch mechanisms 24 are released and the lower edges 22 and 26 of fan cowl doors 15 and 16 are moved apart. The guide bracket 136 on the latch body 137 moves away from the support bracket 134 on the latch body 135 thereby bringing the snib element 144 out of engagement with the recess 149 in the projection element 133, which thereupon moves under gravity to its projecting position as illustrated in FIGS. 11, 13 and 14.

It is arranged that the projection element 133 is released from the snib element 144 wren the door edges 22 and 26 are moved beyond a predetermined maximum spacing as shown in FIG. 14. Beyond the maximum spacing of the two doors any attempt at stowing the projection element 133 in its retracted position is of no avail as the snib element 144 fails to engage in the recess 149 in the projection element 133.

When the two fan cowl doors 15 and 16 are again lowered toward their closed disposition, the foremost face of the hook 29 moves into abutting relation with the bar element 30 of the latch part 23. The two doors 15 and 16 then have the appearance of being in their closed disposition but the latch mechanism 24 will not have been operated. In this event, the door edges 22 and 26 are spaced apart beyond the predetermined maximum spacing referred to above and the fact that the latch mechanisms 24 have not operated will become immediately apparent when the projection element 133 is moved to its retracted position and fails to be held by the snib element 144 and again returns to its projecting position.

The fault indicating device described with reference to FIGS. 10 to 14 requires two mounting brackets either machined or cast/machined in aluminium alloy, giving the requisite offsets from the mean door joint line. As shown, these attach to and are supported from the existing latch bodies 135 and 137. The area where maximum fan cowl door clearance exists, and therefore the most suitable location for the device, is just aft of the forward latch mechanism.

The support bracket 134 acts as a flat support surface for the projection element 133 whereas the other bracket 136 provides protruding sections to locate and guide the projection element as it is stowed. On the guide bracket 136 is located the spring loaded snib element 144. This allows the projection element 133 to be pushed in to the retracted position where the snib element 144 locates in the recess 149 in the projection element 133. In this position the lower section of the projection element 133 can be arranged to land on a section of compressible material on the bottom of the support bracket 134.

The projection element 133 may be brightly coloured and formed from a high strength polymer or similar material. It should preferably be weighted bottom heavy to assist the operation of the device.

As best seen in FIGS. 12 and 13 the door skin line at the door edge 22 remains unaltered. However a small section of the door skin must be removed at the opposing door edge 26 to provide clearance for the projection element 133 to be moved between its retracted position and its projecting position. The element 133 is however closed off at its base by an end plate 154 and profiled to maintain the aerodynamic skin line as much as possible.

As hereinbefore described, when the doors 15 and 16 are brought to the latching position, the projection element 133, due to gravitational force, takes a "Fully Out" position. The doors are then fully latched (ie with the projection element still out). Only when the doors are fully latched will the support brackets be at the required spacing to allow the projection element 133 to be stowed in the retracted position. The projection element 133 is then pushed into the "Fully In" position and locks there.

As hereinbefore described, if the doors 15 and 16 are again opened the projection element 133 automatically falls down into the projecting position with the lugs 152 and 153 bearing on the retainer loop element 151. When the doors 15 and 16 are propped open the projection element 133 can be pushed in flush to avoid damage. When the doors are again brought to the latching position the projection element 133 automatically assumes the "Fully Out" projecting position.

The guiding block on the snib support bracket should be tapered away at the bottom to ensure complete clearance from the projection element as the doors 15 and 16 are latched shut. This would have the secondary benefit of ramping the projection element on to the guide block.

The manufacturing tolerance bands need to be such as to ensure that the fault indicating device works at either end of the door gap tolerance band.

Should a secondary indication be required (i.e. light in the cockpit) the device can easily be adapted. Electrical connections could be incorporated into both the snib element 144 and the base of the snib locating recess 149. Only when the projection element 133 is fully stowed in the retracted position would the electrical circuit be complete.

We claim:

1. A supernatural assembly comprising first and second closure parts displaceable relative to one another between a closed disposition in which a closing edge of one closure part is generally aligned with a closing edge of the other closure part to provide a rear side of the closure parts closed off from a front side of the closure parts and open dispositions in which the closing edge of one closure part is spaced from the closing edge of the other closure part, a locking mechanism for locking the closure parts in the closed disposition, and a default indicating device comprising a projection element which is movable against biasing means to the rear side of the closure parts and is released when the closure parts move to a predetermined open disposition wherein a gap is formed between the closing edges of the closure parts and which moves in response to the biasing means to a projecting position in which it projects through the gap between the closure parts to the front side to provide on the front side of the closure parts a visual warning that the closure parts are not in the closed disposition.

2. An assembly according to claim 1 wherein the projection element is in the form of an elongate indicator arm, wherein the first of the closure parts includes arm support means at the rear side thereof, and wherein the indicator arm is mounted for rotation at a pivotal end thereof on the support means and is rotatable from an operational position at the rear side of the closure parts to the projecting position under the action of the biasing means.

3. An assembly according to claim 2 wherein the pivotal end of the arm is additionally movable on the support means in the direction of the axis of rotation of the arm from a stowed axial position in which the arm is held captive at the rear side of the first closure part to an operational axial position in which the arm is clear of the first closure part so as to be free therefrom to rotate to the projecting position, wherein the arm is biased to the operational axial position, wherein restraining means are provided to prevent movement of the arm from the stowed axial position to the operational axial position, wherein release means are provided to cause the restraining means to release the arm when the closure parts are moved toward their closed disposition and into a release disposition, thereby to allow the arm to move to the operational axial position whereby subsequent movement of the two closure parts away from their release disposition to the predetermined open disposition results in movement of the arm from the operational axial position to the projecting position.

4. An assembly according to claim 3 wherein the restraining means takes the form of an arm restraining means on the first closure part which is engaged by the arm and wherein the release means is provided on the second closure part for releasing the arm from the restraining means when the two parts are moved into the release disposition.

5. An assembly according to claim 4 wherein the arm is formed with an aperture spaced from the pivotal end of the arm and the release means comprises a pin mounted on the second closure part for engagement in the aperture when the closure parts are moved into the release disposition, wherein the pin is located in a position in which its longitudinal axis is offset from the central axis of the aperture when the arm is in the stowed axial position, wherein the pin is so contoured as to engage in the aperture in the arm when the arm is in the stowed axial position and to displace the arm from the restraining means on the first closure part when the closure parts are moved into the release disposition, thereby to allow the arm to move to the operational axial position and wherein the aperture is so shaped and dimensioned in relation to the pin that the arm is held by the pin in the operational axial position.

6. An assembly according to claim 5 wherein the aperture is formed in a free end of the arm remote from the pivotal end and wherein the arm restraining means on the first closure part is engaged by the free end of the arm.

7. An assembly according to claim 4 wherein the arm restraining means is such as to restrain the arm in the stowed axial position while the closure parts are being moved toward their closed disposition but insufficient to restrain the arm as the respective closing edges of the closure parts become generally aligned, such that in the event that the closure parts are not brought into the closure disposition, the projecting element will move toward the projecting position.

8. An assembly according to claim 5, wherein the pin includes a base portion for holding the arm in the operational axial position and an end portion having a locally reduced lateral dimension, and wherein the aperture in the arm communicates with a slot in the arm, whereby when an attempt to bring the closure parts to the closed disposition fails with the end portion only of the pin being brought to a position corresponding to the operational axial position of the arm, the arm releases from the restraining means, moves to the operational axial position and then under the torsional force of the spring and by engagement of the locally reduced end portion in the slot in the arm moves to an intermediate projecting position in which it projects through the gap between the closure parts to the front side of the closure parts, thereby to give a visual warning that the closure parts are not in the closed disposition.

9. An assembly according claim 8 wherein the biasing means comprises a torsion element one end of which is secured to the first closure part and the other end of which is secured to the arm, whereby torsion is imparted to the element when the arm is moved from its projecting position to the rear side of closure parts and the torsional force released to move the arm from its operational axial position to the projecting or intermediate projecting position.

10. An assembly according to claim 9 wherein the torsion element is also a compression element, and wherein the arm in moving into the stowed axial position compresses the element, the compressive force of which then serves upon release of the arm from the restraining means to drive the arm to the operational axial position.

11. A structural assembly comprising first and second closure parts displaceable relative to one another between a closed disposition in which a closing edge of one closure part is generally aligned with a closing edge of the other closure part to provide a rear side of the closure parts closed off from a front side of the closure parts and an open disposition in which the closing edge of each closure part is spaced from the closing edge of the other closure part, a locking mechanism for locking the closure parts in the closed disposition, and a default indicating device operable independently of the locking mechanism comprising a projection element which is movable to the rear side of the closure parts and held in a retracted position when the closure parts are in the closed disposition, said projecting element being held against a biasing force which is urging said projection element to a projecting position, and which is released when the closure parts move to a predetermined open disposition and upon release from the retracted position moves as a result of the biasing force to the projecting position in which it projects at the front side of the closure parts through translational movement from the retracted position at the rear side of the closure parts to the projecting position to provide on the front side a visual warning that the closure parts are not in the closed disposition.

12. An assembly according to claim 11 wherein the first of the closure parts includes support means at the rear side thereof and wherein the projection element is mounted on the support means for said translational movement from the retracted position at the rear side of the closure parts to the projecting position.

13. An assembly according to claim 12 wherein the projection element is of elongate form and moves from the retracted position to the projecting position in a direction parallel to the longitudinal axis of the element.

14. An assembly according to claim 13 wherein the orientation of the assembly is such that the translational movement of the projection element from the retracted position to the projecting position is downward, and wherein the biasing force is provided by the weight of the projection element.

15. An assembly according to claim 12, wherein holding means are provided to hold the projection element in the retracted position when the closure parts are in the closed disposition and to release the projection element when the closure parts move to the predetermined open disposition.

16. An assembly according to claim 15 wherein the holding means comprises a pin mounted on the second closure part for engagement with the projection element to hold the projection element in the retracted position when the closure parts are in the closed disposition.

17. An assembly according to claim 16 wherein the projection element is formed with an abutment face and wherein the pin has a forward end which in an engaging position of the pin engages with the abutment face on the element to hold the projection element in the retracted position when the closure parts are in the closed disposition and wherein movement of the closure parts to the predetermined open disposition causes the forward end of the pin to disengage from the abutment face on the element to allow the element to move from the retracted position to the projecting position.

18. An assembly according to claim 17 wherein the support means on the first closure part so supports the projection element in the projecting position that the projection element is clear of the pin, whereby the closure parts can be brought to the closed disposition with the projection element in the projecting position, wherein the pin is biased by a biasing force into the engaging position and wherein the pin is displaceable against the biasing force applied to it to permit the projection element to be moved from the projecting position into the retracted position whereupon the pin is biased by the biasing force into the engaging position in which the forward end engages with the abutment face on the projection element.

19. An assembly according to claim 18 wherein the abutment face on the projection element is formed by an upper end wall of a slot formed in the element.

20. An assembly according to claim 19 wherein the forward end of the pin and the upper end of the projection element are so contoured as to facilitate displacement of the pin by the projection element when bringing the projection element from the projecting position to the retracted position with the closure parts in the closed disposition.

21. An assembly according to claim 20 wherein the support means on the first closure part so positions the projection element that its outermost longitudinal side face is flush with the edge of the first closure part, and wherein the first closure part includes a cut-away portion at the edge thereof to accommodate and provide for displacement of the projection element between the retracted position and the projection position.

22. An assembly according to claim 21 wherein the outermost end of the projection element is so dimensioned as to substantially fill the cut away portion when the projection element is in the retracted position and the retracted position is such that the outermost end of the projection element is flush with the front surface of the first closure part when the projection element is in the retracted position.

23. An assembly according to claim 18 wherein the pin is biased into the engaging position by a biasing spring mounted on the second closure part.

24. An assembly according to claim 1 wherein the locking mechanism takes the form of a toggle operated latch mechanism comprising a first component part including a toggle lever and a toggle lever operated hook element which extends from one of the closure parts, and a terminal hook and a second component part including a fixed element which is mounted on the other closure part, wherein engagement of the hook behind the fixed element and complete throw of the toggle lever draws the closure parts into the closed disposition and locks them in the closed disposition.

25. An assembly according to claim 1 wherein the first and second closure parts are access doors in an aero engine nacelle which has said closing edges which move into the closed disposition at a predetermined position of the access doors and are locked in the closed disposition by the locking mechanism whereby the projection element when in the projecting position extends from the body of the nacelle and is visible to personnel to alert them to the fact that the access doors have not been moved into the closed disposition.

26. An assembly according to claim 25, wherein the access doors are right hand and left hand fan cowl doors which are hinged at their upper edges to the upper part of the nacelle, wherein said closing edges are bottom edges which move into the closed disposition at the base of the nacelle and wherein the projecting element, when in the projecting position, depends from the body of the nacelle.

27. An assembly according to claim 25 wherein the locking mechanism comprises a plurality of latch mechanisms arranged at spaced positions along the closing edges of the doors and wherein the default indicating device is located between two adjacent latch mechanisms.

28. An assembly according to claim 11 wherein the locking mechanism takes the form of a toggle operated latch mechanism comprising a first component part including a toggle lever and a toggle lever operated hook element which extends from one of the closure parts, and a terminal hook and a second component part including a fixed element which is mounted on the other closure part, wherein engagement of the hook behind the fixed element and complete throw of the toggle lever draws the closure parts into the closed disposition and locks them in the closed disposition.

29. An assembly according to claim 11 wherein the first and second closure parts are access doors in an aero engine nacelle which has said closing edges which move into the closed disposition at a predetermined position of the access doors and are locked in the closed disposition by the locking mechanism whereby the projection element, when in the projecting position, extends from the body of the nacelle and is visible to personnel to alert them to the fact that the access doors have not been moved into the closed disposition.

30. A structural assembly comprising first and second closure parts displaceable relative to one another between a closed disposition in which a closing edge of one closure part is generally aligned with a closing edge of the other closure part to provide a rear side of the closure parts closed off from a front side of the closure parts and open dispositions in which the closing edge of one closure part is spaced from the closing edge of the other closure part, a locking mechanism for locking the closure parts in the closed disposition, and a default indicating device operable independently of the locking mechanism comprising a projection element which is movable against biasing means to the rear side of the closure parts and is released when the closure parts move to a predetermined open disposition wherein a gap is formed between the closing edges of the closure parts and which moves in response to the biasing means to a projecting position in which it projects through the gap between the closure parts to the front side to provide on the front side of the closure parts a visual warning that the closure parts are not in the closed disposition.

* * * * *